United States Patent Office 2,951,084
Patented Aug. 30, 1960

2,951,084

CORTISONE DERIVATIVES AND METHOD OF PREPARING THE SAME

Seymour Bernstein, Pearl River, N.Y., and Robert H. Lenhard, Ridgefield Park, N.J., assignors to American Cyanamid Company, New York, N.Y., a corporation of Maine No Drawing. Filed Aug. 20, 1956, Ser. No. 605,204

9 Claims. (Cl. 260—397.45)

This invention relates to new steroid compounds. More particularly, it relates to 9α-halo-16α-hydroxy-cortisone, esters thereof, and methods of preparing the same.

It has been known that 9α-fluoro-cortisone is more active than cortisone; Fried et al., J. Am. Chem. Soc., 75, 2273, (1953), and 76, 1455, (1954). However, 9α-fluoro-cortisone has such a high electrolyte activity (sodium retention) that its clinical application is limited. We have now found that 9α-halo-16α-hydroxy-cortisone and esters thereof are highly active in the rat liver glycogen deposition test without the undesirable sodium retention effect.

The compounds of the present invention can be illustrated by the following general formula:

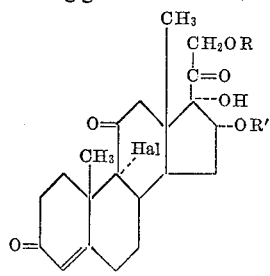

in which R and R' are members of the group consisting of hydrogen and lower alkanoyl radicals and Hal is a halogen radical, such as chlorine, bromine, or fluorine.

The compounds of the present invention are relatively high melting crystalline solids. They are soluble in the common organic solvents and relatively insoluble in water.

The compounds are prepared from 4-pregnenes, such as diesters of 9α-halo-11β,16α,17α-21-tetrol-4-pregnene-3,20-dione, which are described and claimed in our copending application Serial No. 519,249, filed June 30, 1955 now U.S. Patent 2,773,080. When these intermediates are reacted with chromic anhydride, the hydroxy radical in the 11-position is oxidized to a keto group. The reaction is generally carried out in a solvent such as pyridine, carbon tetrachloride, and the like. The temperature range during the course of the reaction is maintained at from about 0° to about 30° C. Following completion of the reaction, which can range from 30 minutes to 24 hours, the reaction mixture is usually poured into ice water and the precipitate washed with water. The desired product is then extracted with a solvent, for example, ethyl acetate. On evaporation of the solvent, the crude product is obtained, which can be purified by conventional methods. Following completion of the reaction, the reaction mixture can be evaporated to dryness directly and the product purified by recrystallization or other well-known methods.

The 16α21-diester groups of the present compound can be removed by saponification with sodium or potassium hydroxide to produce the free alcohols.

The 9α-fluoro- (or -chloro-) 16α-hydroxy-cortisone of the present invention is very active physiologically. The activity of these compounds exceeds that of cortisone or hydrocortisone. They can be used both internally for systemic effect and topically for local effect, e.g., in such conditions as rheumatoid arthritis, atopic dermatitis, asthma, bursitis, etc. The compounds can be used in the form of capsules, pills, tablets, solutions for injection, ointments, salves, and the like.

The following examples describe in detail the preparation of 9α-halo-16α-hydroxy-cortisone and derivatives thereof.

*Example 1*

A solution of 16α,21-diacetoxy-9α-fluoro-11β,17α-dihydroxy-4-pregnene-3,20-dione (240 mg.) in pyridine (6 ml.) was added to a slurry of chromic anhydride (180 mg.) in pyridine (2.5 ml.). After standing at room temperature (24° C.) for 20 hours, the solution was poured into ice water and the precipitate washed well with water. The organic residue was dissolved in ethyl acetate and the inorganic residue removed by filtration. The filtrate was washed with saturated saline, dried, and evaporated to afford a white crystalline solid. Crystallization from acetone-petroleum ether gave 150 mg. of product, melting point 221.5°–223° C. with previous softening. Two additional crystallizations from acetone-petroleum ether gave 131 mg. of pure 16α,21-diacetoxy-9α-fluoro-17α-hydroxy-4-pregnene-3,11,20-trione, melting point 233°–224° C. with previous softening; ultraviolet: $\lambda_{max}$. 234.5 m$\mu$ ($\epsilon$ 16,100) (abs. alc.). The latter fraction was crystallized once more for optical rotation and analysis (did not alter melting point); $[\alpha]_D^{25}$ +98° (chloroform).

Analysis.—Calc'd for $C_{25}H_{31}O_8F$ (478.50): C, 62.75; H, 6.53; F, 3.97. Found: C, 62.81; H, 6.58; F, 4.10.

*Example 2*

A solution of 16α,21-diacetoxy-9α-chloro-11β,17α-dihydroxy-4-pregnene-3,20-dione (300 mg.) in pyridine (6 ml.) was added to a slurry of chromic anhydride (215 mg.) in pyridine (3 ml.). After standing at room temperature (26° C.) for 17 hours, the solution was poured into ice-water and worked up as above. The white crystalline solid so obtained was crystallized from acetone-petroleum ether to afford 168 mg. of product, melting point 224°–227.5° C. with previous softening (brn. melt). Three additional crystallizations from acetone-petroleum ether gave pure 16α,21-diacetoxy-9α-chloro - 17α - hydroxy - 4 - pregnene - 3,11,20 - trione, melting point 226.5°–229.5° C., brown melt, with previous softening; ultraviolet: $\lambda_{max}$. 235.5 m$\mu$ ($\epsilon$ 15,400) (abs. alc.), $[\alpha]_D^{25}$+165° (chloroform).

Analysis.—Calc'd for $C_{25}H_{31}O_8Cl$ (494.96): C, 60.66; H, 6.31; Cl, 7.16. Found: C, 60.63; H, 6.07; Cl, 6.82.

We claim:

1. A compound having the general formula

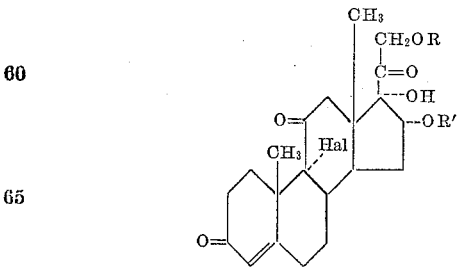

in which R and R' are the same and are members of the group consisting of hydrogen and lower alkanoyl radicals and Hal is a halogen of the group consisting of fluoro and chloro atoms.

2. 9α - fluoro - 16α,17α,21 - triol - 4 - pregnene-3,11,20-trione.

3. 9α - chloro - 16α,17α,21 - triol - 4 - pregnene - 3,11,20-trione.

4. 16α,21 - diacetoxy - 9α - fluoro - 17α - hydroxy-4-pregnene-3,11,20-trione.

5. 16α,21 - diacetoxy - 9α - chloro - 17α - hydroxy-4-pregnene-3,11,20-trione.

6. A method of preparing 16α,21-diacetoxy-9α-fluoro-17α-hydroxy-4-pregnene-3,11,20-trione which comprises reacting 16α,21 - diacetoxy - 9α - fluoro - 11β,17α-dihydroxy-4-pregnene-3,20-dione with chromic anhydride in a solvent.

7. A method of preparing 16α,21-diacetoxy-9α-chloro-17α-hydroxy-4-pregnene-3,11,20-trione which comprises reacting 16α,21 - diacetoxy - 9α - chloro - 11β,17α-dihydroxy-4-pregnene-3,20-dione with chromic anhydride in a solvent.

8. A method of preparing compounds having the general formula

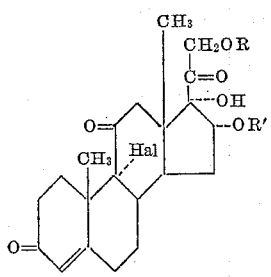

in which R and R' are lower alkanoyl radicals and Hal is a halogen of the group consisting of fluorine and chlorine atoms which comprises reacting the corresponding 11-hydroxyl steroid with chromic anhydride in a solvent.

9. A compound of the formula:

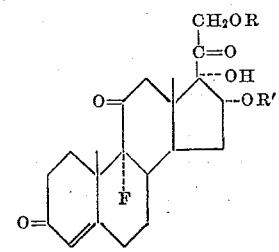

wherein R and R' are the same and are selected from the group consisting of hydrogen and lower alkanoyl radicals.

References Cited in the file of this patent
UNITED STATES PATENTS

| | | |
|---|---|---|
| 2,672,467 | Hanze | Mar. 16, 1954 |
| 2,678,933 | Meister | May 18, 1954 |
| 2,707,190 | Farrar | Apr. 26, 1955 |
| 2,751,402 | Schneider | June 19, 1956 |
| 2,773,080 | Bernstein | Dec. 4, 1956 |